July 27, 1965
J. G. H. OLLIER ETAL
3,196,590
APPARATUS FOR VACUUM PACKAGING
Filed Oct. 17, 1962
2 Sheets-Sheet 2
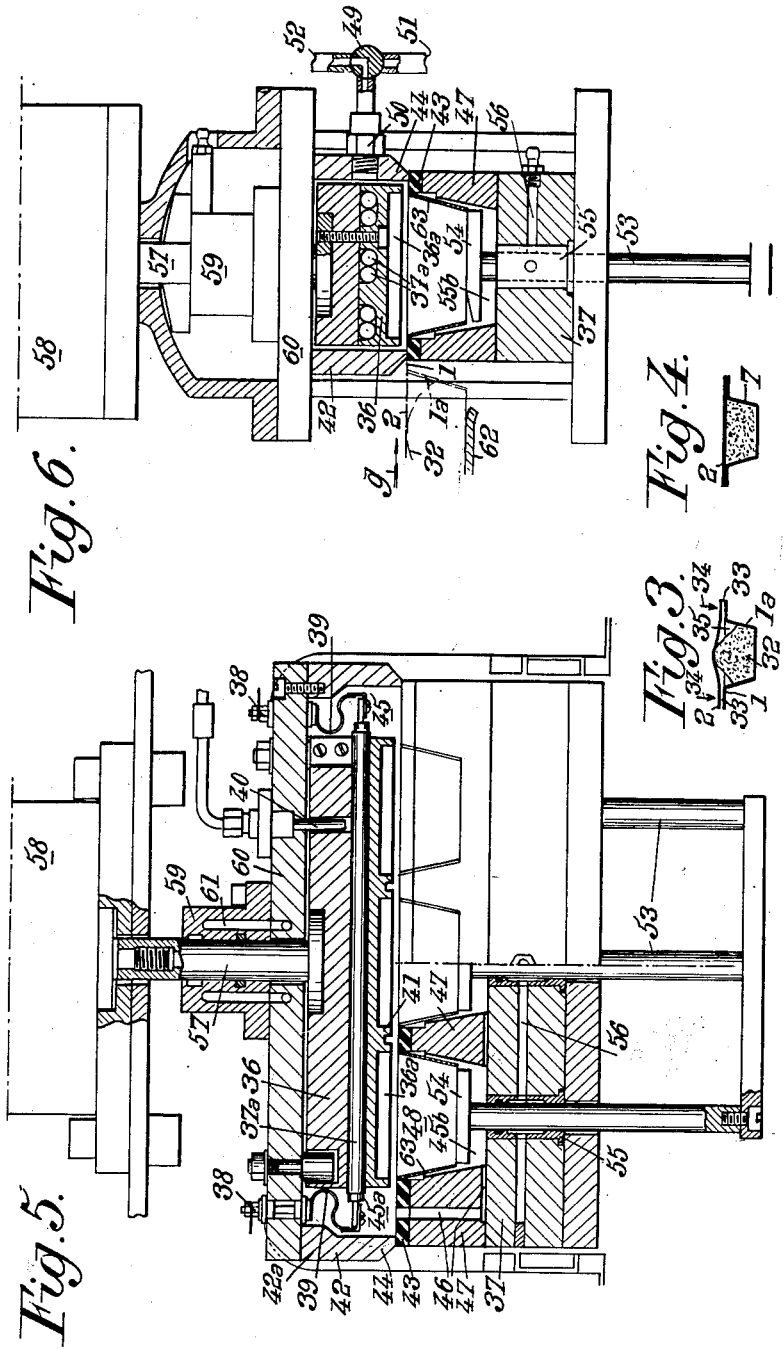

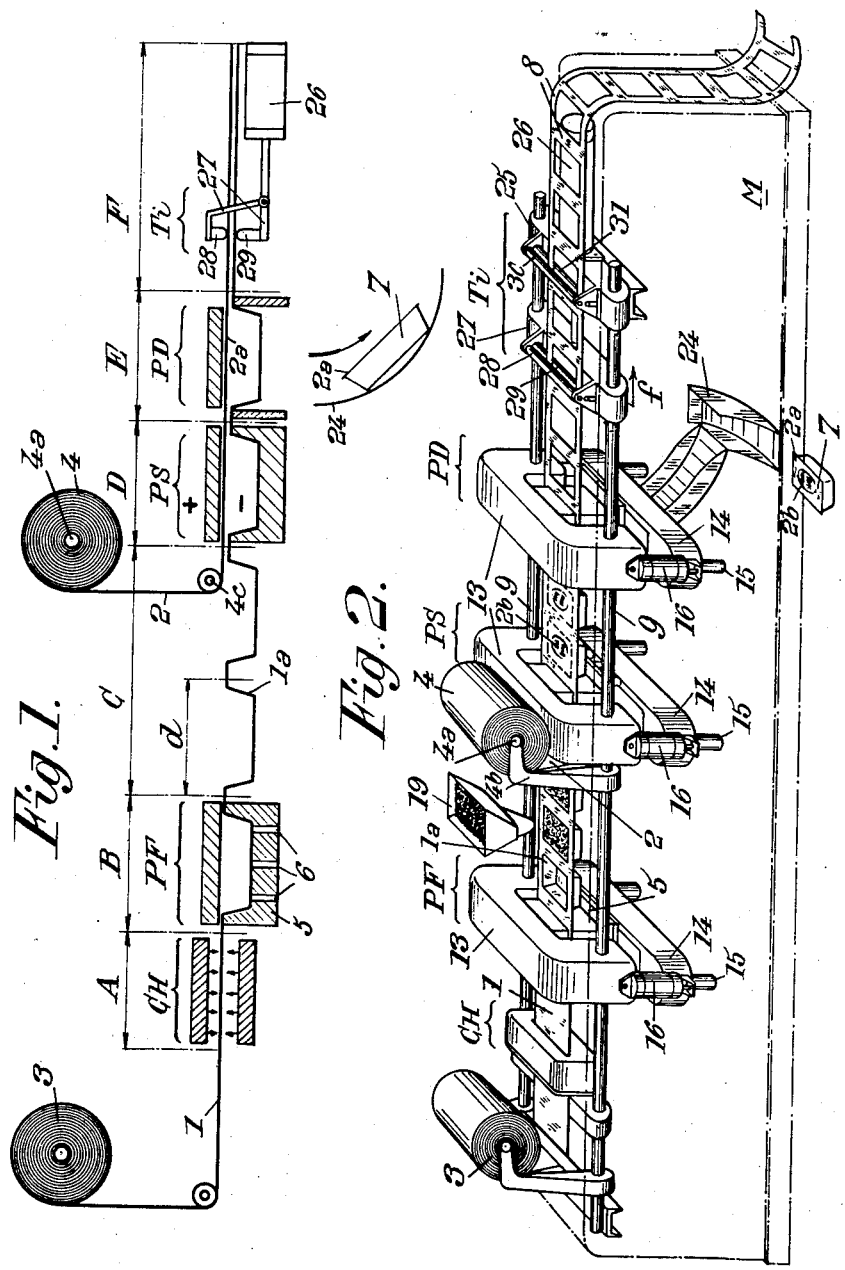

United States Patent Office

3,196,590
Patented July 27, 1965

3,196,590
APPARATUS FOR VACUUM PACKAGING
Jacques Gaspard Honoré Ollier, 17 Rue General Henrion Bertier, Neuilly-sur-Seine, France; Georges Frédéric Grosshans, 53 bis Rue de Boulainvilliers, Paris, France; and Robert Gaston Masson, 6 Blvd. de Courbevoie, Neuilly-sur-Seine, France
Filed Oct. 17, 1962, Ser. No. 231,125
3 Claims. (Cl. 53—112)

This invention relates to methods of, and apparatus for, making closed boxes containing a product having poor flow characteristics.

In a known method of making closed boxes a quantity of a product is placed inside an open-topped box and a top side is then secured to the open-topped box by heat-sealing to form a closed box. To achieve a high output a longitudinally extending series of open-topped boxes may be formed in a first strip of material and each box successively filled with the required product and heat sealed to a part of a second strip disposed alongside the first strip. The resultant closed box is then cut away from the composite strip.

Difficulties are experienced in carrying out this method with products which have poor flow characteristics, by which is meant products such as white cheese or cream cheese, or products composed of small particles such as granular sugar, which when dispensed into an open-topped box do not spread readily to provide a flat, upper surface. If the volume of such a product placed in an open-topped box is substantially equal to the volume of the box itself some of the product will extend above the top of the side walls of the box, and when the top side is installed some of the product may be forced between the topside and the side walls, and prevent a satisfactory seal from being obtained.

It is an object of the present invention to provide a method of, and apparatus for, making closed boxes containing a product having poor flow characteristics by means of which these difficulties can be reduced.

The present invention includes a method of making a closed box containing a product having poor flow characteristics comprising placing a quantity of the said product inside an open-topped box, arranging the open-topped box inside an enclosure with a top side immediately above the box, reducing the pressure within the enclosure to a value below atmospheric pressure, securing the top side to the box so as to form a substantially gas-tight closed box, and restoring the pressure within the enclosure to atmospheric pressure, whereby a pressure differential is created between the exterior and interior of the closed box which effects movement of one side at least of the closed box thereby causing the product substantially uniformly to fill the box.

The present invention also contemplates the provision of apparatus for making a closed box containing a product having poor flow characteristics comprising an enclosure, supporting means for supporting an open-topped box containing a quantity of the product and a top side for the box within an enclosure with the top side immediately above the open-topped box, means for reducing the pressure within the enclosure to a value below atmospheric pressure, and means for securing the top side to the open-topped box to form a substantially gas-tight closed box while the interior of the enclosure is at the said pressure below atmospheric pressure, whereby upon restoring the pressure within the enclosure to atmospheric pressure, a pressure differential is created between the exterior and interior of the closed box which effects movement of one side at least of the closed box thereby causing the product substantially uniformly to fill the box.

The invention will now be described, by way of example, with reference to the accompanying drawings, in which:

FIG. 1 is a view in elevation and FIG. 2 is a perspective view of a known apparatus for forming closed boxes;

FIGS. 3 and 4 illustrate the disposition of a box at successive stages in a method according to the invention;

FIG. 5 is a transverse view, partly in section, of a a heat sealing station for carrying out the method according to the invention and which can be added to the apparatus shown in FIGS. 1 and 2; and FIG. 6 is a longitudinal sectional view of the heat-sealing station shown in FIGURE 5.

The apparatus illustrated in FIGS. 1 and 2 of the drawings is effective for producing a series of closed boxes from two strips of an extensible plastic material such as polyvinyl chloride, polystyrene or low density polyethylene.

At one end of the apparatus there is provided a spindle 3a upon which is wound a reel 3 of a first strip 1 of the material and at an intermediate point along the length of the apparatus is a further spindle 4a carrying a reel 4 of a second strip 2 of the material. The strip 1 is used to provide the bases and side walls of the boxes and the strip 2 the covers, the latter having labels 2b printed thereon at locations spaced apart along its length.

From the spindle 3a the path of the strip 1 extends vertically downwards to a guide roller 3c and then horizontally through successive zones A, B, C, D, E, and F of the apparatus. The path of the strip 2 extends vertically downwards to a guide roller 4c, disposed at the beginning of zone D, and thence extends through zones D, E and F, immediately above the path of strip 1. The strips are moved along these paths by predetermined distances at periodic intervals by means of a conveying device T*i* disposed in zone D, the detailed construction of this device being described hereinafter.

In its passage through the apparatus a section of the strip 1 first passes through a heating device CH in zone A, which softens the section, and thence to a moulding device PF in zone B. The lower part of the latter device consists of a mould 5 of shape corresponding to that required for the base and side walls of the boxes and formed with apertures 6 whereby its interior can be subjected to a reduced pressure. Under the influence of this reduced pressure the central part of a softened section of the strip 1 is deformed to the shape of the mould 5, forming an open-topped box of the form designated 1*a* in FIGS. 1 and 2. In the succeeding zone, zone C, this box is filled with the product to be stored therein by means of a dispenser 19.

The section of strip 1 next enters zone D of the apparatus where it is disposed immediately beneath a labelled section of the strip 2 from reel 4 and within a welding device PS. In this zone the peripheral parts of the two strips are joined together by the welding device PS to form a closed box 7.

In order to separate the closed box 7 from the remainder of the composite strip thus formed from strips 1 and 2, there is provided a cutting and ejecting device PD in zone E, the box 7 being ejected from the apparatus by means of a shute 24 and the perforated, composite strip 8 passing on to zone F wherein the conveying device T*i* is mounted.

The moulding device PF, welding device PS, and cutting and ejecting device PD each includes a gantry 13, comprising a horizontal member which extends transversely over the path of the strip 1 and two vertical members disposed on opposite sides, respectively of the path of this strip. The vertical members of each gantry 13 are clamped to respective horizontal bars 9 which extend through the apparatus and are disposed parallel with, and on opposite sides of, the path of strip 1. Each device also includes a base member 14 which is movable in a vertical direction relative to its gantry 13 by means of a jack 16. Guides 15 are provided for confining movement of the members 14 to the vertical direction.

The conveying device Ti in zone F includes a cross bracket 25 which is rigidly attached at opposite ends thereof to the bars 9 and carries a jack 26. Mounted on the end of the jack remote from the bracket 25 is a further bracket 27 which is slidably mounted on the bars 9 and carries two clamping jaws 28 and 29 disposed above and below, respectively, the path of the composite strip 8. The jack 26 is provided with a driving means whereby the bracket 27 can be moved backwards and forwards along the length of the bars 9, the jaws 28 and 29 clamping the composite strip and drawing it forwards by a predetermined distance d when the movable part of the jack moves in a forward sense, and releasing the strip so as to effect no movement thereof on its return.

The cross bracket 25 also carries guide rollers 30 and 31 for guiding the composite strip 8 out of the apparatus.

If the product which is to be stored in the closed boxes has poor flow characteristics it does not assume a uniform distribution throughout an open-topped box 1a but forms a heap 32 immediately below the outlet of the dispenser 19, as indicated in FIG. 3 of the drawings. The top of this heap is above the top of the side walls of the box 1a if the volume of the product therein is substantially equal to the volume of the box itself, and accordingly the strip 2 rests on top of the pile when the strips 1 and 2 are disposed alongside one another in the heat sealing device PS. Attempts to flatten the pile by pressing downwards on the strip 2 result in entry of some of the product into a gap 33 which remains between the peripheral parts of the strips. It thereby becomes very difficult to obtain a satisfactory heat-seal.

In order to overcome this difficulty the heat sealing device PS shown in FIGS. 1 and 2 is replaced by the device according to the invention which is illustrated in FIGS. 5 and 6.

In this latter device a block 47 is secured to a lower plate 37 and is movable in a vertical direction by means not shown in the drawings. In its upper position, shown in FIGS. 5 and 6, the block 47 engages with a fixed dome-shaped member 42 carried by a top plate 60 to form an enclosure 45 within which strips 1 and 2 can be joined together by heat-sealing. A gasket 43 at the top of the block engages with peripheral parts 44 of the member 42 and ensures that the enclosure thus formed is substantially gas-tight.

The block 47 is formed with three cavities 48 which are disposed in line with one another transversely of the path of the strips 1 and 2, and the device can therefore operate with three strips 1 of the form illustrated in FIGS. 1 and 2 of the drawings at the same time, or, alternatively, with a strip 1 having three longitudinally extending series of open-topped boxes disposed side by side. In each cavity 48 is a container, formed of side walls 63 and a base 54, of internal dimensions corresponding to the external dimensions of the open-topped boxes 1a. These containers are mounted at the top of respective supporting rods 53 which extend through the lower plate 37, bearings 55 being provided to allow for vertical movement of the lower plate 37 and block 47 relative to the rods 53. Ducts 56 in the lower plate 37 allow lubricating oil to be supplied to the bearings 55.

When the block 47 is in its upper position, as shown in FIGURES 5 and 6, the enclosure 45 includes an upper part 45a and a lower part 45b which are in communication with one another via conduits 46 in the block 47.

In the upper part of the enclosure 45 is a heat-sealing electrode 36 which is formed with three depressions 36a above the respective cavities 48. Each depression is of a shape corresponding to that of the top side of a box and projecting parts 41 of the electrode 36 are of a shape corresponding to the parts of strips 1 and 2 which are to be sealed together. The electrode is heated by means of heating coils 37a which are connected to terminals 38 in the top plate 60 by means of conductors 39. A pyrometer probe 40 enables the temperature of the electrode 36 to be measured.

The electrode 36 is mounted at the lower end of a supporting rod 57 which extends through a bearing 59 on the top plate 60 and is movable through a short distance in the vertical direction by means of an air-operated jack 58. To reduce heating of the bearing 59, water or some other cooling fluid is circulated through channels 61 formed therein.

The enclosure 45 can be placed in communication with the atmosphere or with a vacuum pump by means of a three way valve 49 connected to an outlet conduit 50 and provided with inlet conduits 51 and 52.

In the operation of the device, the lower plate 37 and block 47 are lowered relative to the dome-shaped member 42 and the rods 53, and strip 2 and an open-topped box 1a are then moved in the direction indicated by the arrow g in FIGURE 6. The open-topped box 1a is carried by a plate 62 during the early part of this movement, from which it is transferred to one of the containers formed of walls 63 and bases 54. Lower plate 37 and block 47 are then moved upwards by means not shown in the drawings until the gasket 43 comes into contact with the dome shaped member 42 and the gastight enclosure 45 is formed.

Valve 49 is now operated so that inlet conduit 52, which is connected to vacuum pump, is placed in communication with outlet conduit 50, and the pressure within the upper part 45a of the enclosure 45 and the cavities 48 is reduced to a value below atmospheric pressure. Moreover, since the upper part 45a of the enclosure is connected to the lower part 45b by the channels 46 the pressure in this lower part is likewise reduced. The interior of the open-topped box is also at the same pressure below atmospheric pressure owing to the gap 33 between the strip 2 and the top of the open-topped box.

Electrode 36 is now moved downwardly by means of the air-operated jack 58 so that its projecting parts 41 press the strip 2 into contact with the peripheral parts of the open-topped box 1a, sealing the two together to form a substantially gas-tight closed box 7. At the end of the heat-sealing process electrode 36 is returned to its upper position and valve 49 is operated to connect the outlet conduit 50 to inlet conduit 51, thereby returning the pressure within the enclosure 45 to atmospheric pressure. Finally, lower plate 37 and block 47 are lowered and the closed box 7 removed from the device by means of the conveying device Ti.

As a result of this process the interior of the closed box 7 is at a pressure below atmospheric pressure and its exterior is at atmospheric pressure. Accordingly, the top side of the box is urged inwardly against the pile 32 of the product, causing the latter to assume a substantially uniform distribution, as indicated in FIG. 4.

In an alternative embodiment, a gas such as nitrogen is introduced into the enclosure 45 while the latter is maintained at a pressure less than atmospheric pressure during the heat-sealing process. As a result the interior of the closed box 7 contains this gas, at a pressure less than atmospheric pressure, at the end of the process. This is advantageous if the product to be stored is one which deteriorates after prolonged exposure to air.

What we claim is:

1. Apparatus for making step-by-step a band of closed boxes, each containing a determined quantity of a product, from a first strip of flexible material formed with a longitudinally extending series of open-topped boxes containing said quantity of product and a second flat strip of material, comprising in combination:

an evacuable enclosure comprising fixed upper enclosing means and movable lower enclosing means, said upper and lower enclosing means cooperating to provide a substantially gas-tight enclosure when said movable lower enclosing means is in its upper position, while movement of said movable lower enclosing means to its lower position provides an inlet aperture for entry of an open-topped box of said first strip and a portion of said second flat strip into said enclosure;

drawing means for advancing step-by-step into said enclosure an open-topped box of said first strip containing said determined quantity of said product and a portion of corresponding length of said second strip with said portion of said second strip immediately above said open-topped box;

means for reducing the pressure within said enclosure to a value below atmospheric pressure;

a heat sealing electrode disposed in said enclosure above the position assumed by said portion of said second strip, the lower part of said electrode having the shape of the contour of said open-topped boxes;

electrode advancing means for moving said electrode downwardly into contact with said contour, thereby sealing the portion of said second strip to the open-topped box containing said quantity of product to form a gas-tight closed box containing said quantity of product while the pressure within said enclosure is maintained to said value below atmospheric pressure, whereby, upon restoring the pressure within said enclosure to atmospheric pressure, a pressure differential is created between the outside and the inside of said gas-tight closed box which produces a motion of at least one side of said flexible material forming said closed box thereby causing said determined quantity of said product inside said box to fill substantially uniformly said gas-tight closed box, and means for repeating the step-by-step cycle of advancing said first and said second strip, reducing the pressure within said enclosure, sealing said box and restoring the atmospheric pressure within said enclosure.

2. Apparatus as claimed in claim 1, comprising a container within the enclosure for holding the open-topped box, and a supporting rod which is fixed relative to the fixed enclosing means and extends through an aperture provided in the movable enclosing means, the container being mounted on the supporting rod.

3. Apparatus as claimed in claim 2, comprising a container of internal dimensions corresponding to the external dimensions of the open-topped box.

References Cited by the Examiner

UNITED STATES PATENTS

| | | | |
|---|---|---|---|
| 2,888,787 | 6/59 | Cloud | 53—22 |
| 2,918,767 | 12/59 | Grinstead et al. | 53—112 |
| 3,020,686 | 2/62 | Rueckert et al. | 53—112 |
| 3,061,984 | 11/62 | Mahaffy | 53—22 |

FRANK E. BAILEY, *Primary Examiner.*

TRAVIS S. McGEHEE, *Examiner.*